May 20, 1958 N. B. COX 2,835,140
FOOT BRAKE LEVER RELEASE MECHANISM
Filed June 25, 1954 2 Sheets-Sheet 1

Inventor
Norman B. Cox

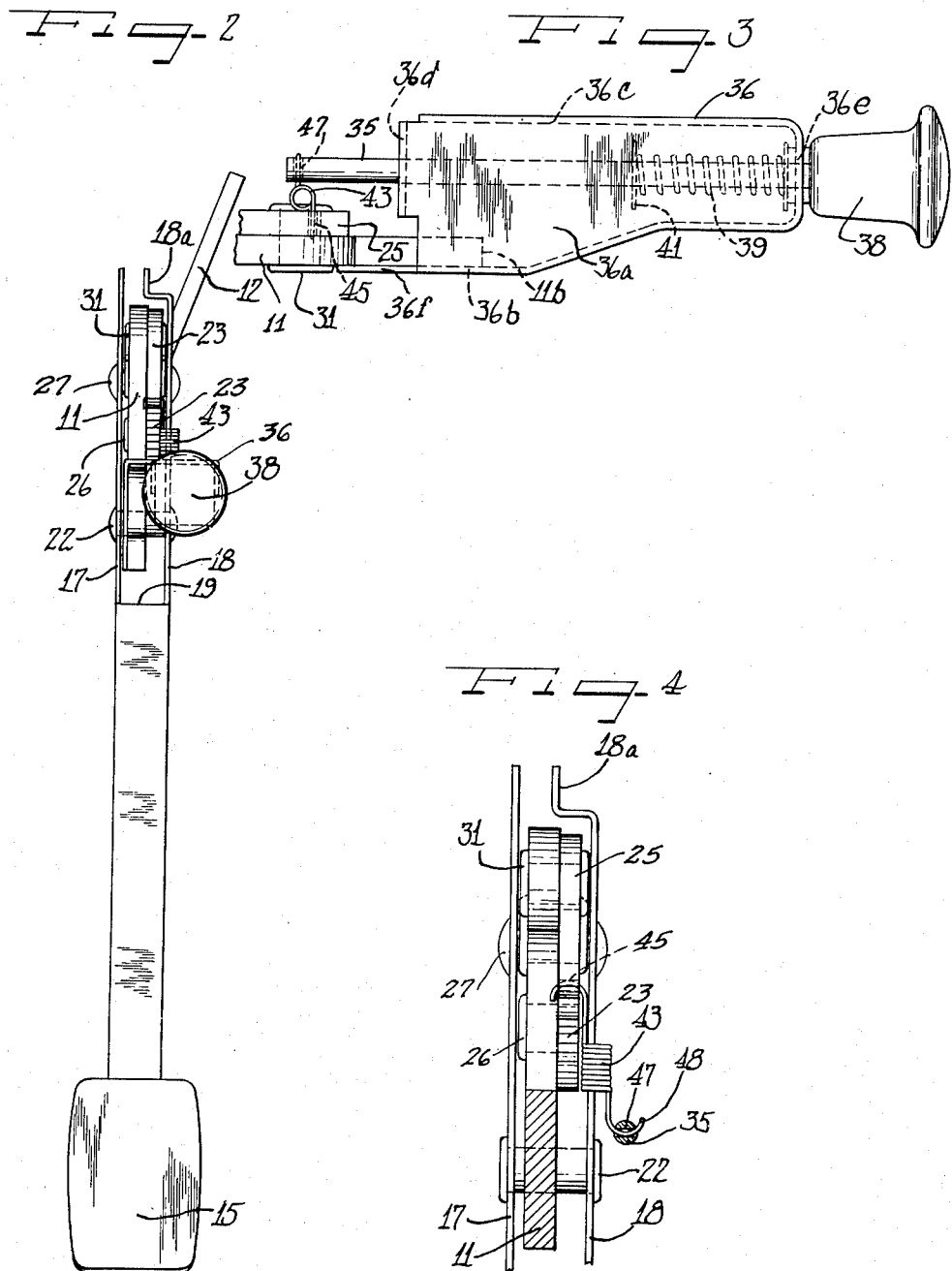

United States Patent Office 2,835,140
Patented May 20, 1958

2,835,140

FOOT BRAKE LEVER RELEASE MECHANISM

Norman B. Cox, Dearborn, Mich., assignor, by mesne assignments, to The Bingham-Herbrand Corporation, a corporation of Ohio Application June 25, 1954, Serial No. 439,278

15 Claims. (Cl. 74—542)

The present invention relates to improvements in foot operated brake levers and more particularly brake levers of the type that are adapted to be used for emergency or parking brakes.

An important object of the present invention is to provide a novel safety arrangement for preventing inadvertent release of a foot operated brake lever.

Another object of the present invention is to provide an improved hand operated pawl release construction for a foot operated brake lever.

A further object is to provide a novel foot operated brake lever construction that can be manufactured and sold as a unit complete for quick assembly in a vehicle with which the brake lever is to be used.

In accordance with the objects and features of the present invention, there is provided a safety arrangement for a foot operated brake lever having a manual release, whereby a slight pressure in the brake release position on the foot pedal is required in conjunction with the manual release to effect release of the brakes.

Other objects, features and advantages of the present invention will be readily apparent from the following detailed description of a preferred embodiment thereof taken in conjunction with the accompanying drawings, in which:

Figure 2 is a front elevational view of the brake lever assembly;

Figure 3 is a fragmentary top plan view of the structure of Figure 1; and

Figure 4 is a fragmentary vertical cross-sectional view taken substantially along the line IV—IV of Figure 1.

Figure 1:
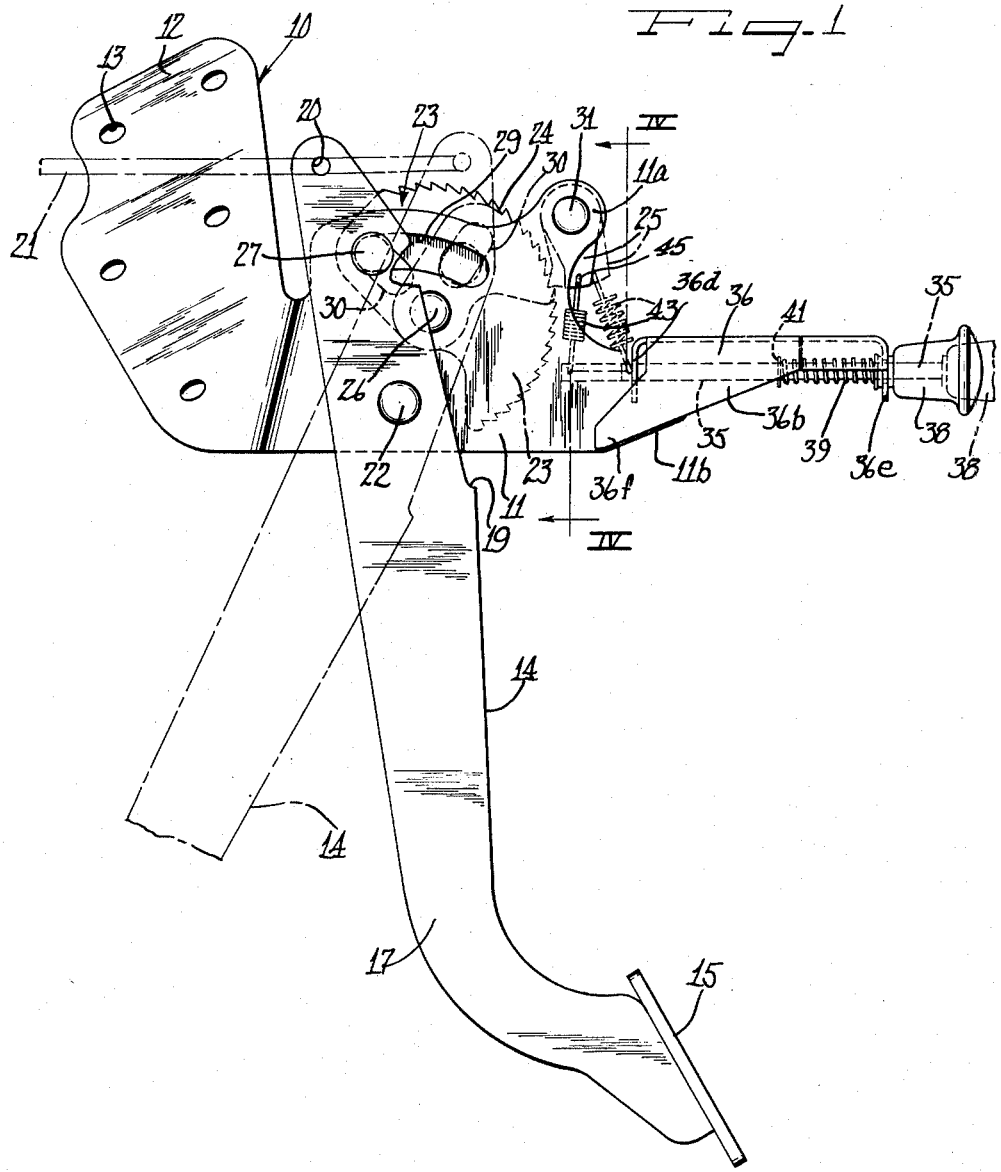
Figure 1 is a side elevational view of a brake lever assembly embodying the features of the present invention.

A brake lever assembly or unit according to the present invention is of the kind that is prefabricated as a complete unit ready for installation in the vehicle with which it is to be used and adapted to be mounted in a convenient position for operation by the foot of the operator of the vehicle, with a manual release mechanism for operation by the hand of the operator in the release of the brake.

By way of example, the brake lever unit as shown in the drawings comprises a mounting bracket 10 which may be formed as a stamping from relatively heavy gauge sheet metal and includes a flat elongated body portion 11 and an attachment head portion 12. The body portion 11 is adapted to be disposed in a vertical plane and is elongated in a front to rear direction, while the head portion 12 may, as shown in Figures 1 and 2, be angled to provide an attachment flange generally conforming to an angular portion of the fire wall or dash panel of an automobile or the like, being provided with a plurality of screw or bolt holes 13.

Pivotally mounted intermediate the ends of the bracket body 11 and at the lower portion thereof, is a foot-operated brake lever 14 including a lower pedal 15 facing generally rearwardly for actuation by the foot of an operator of the vehicle with which the unit is associated. By preference the foot lever 14 is formed from suitable sheet metal in generally U cross-section with the channel thus formed opening forwardly and defined by a left side flange or panel 17 and a right side flange or panel 18. The upper end portions of the side wall flanges 17 and 18 lie in generally spaced parallel relation and with the rear or web portion of the body of the foot lever cut out as indicated at 19 in Figure 2 so that the upper wall portions can straddle the bracket body 11. The upper portions of the lever side walls 17 and 18 project substantially above the upper edge of the bracket body 11 adjacent thereto and are provided with coaxial apertures 20 by which a connector for the end of a brake setting cable indicated schematically in dash outline at 21 can be attached to the upper end of the brake lever 14.

A pivot for the brake lever 14 is provided by a pin or rivet 22 extending through the lever walls 17 and 18 and the bracket body 11. Thereby, the foot brake lever 14 is adapted to swing between the full line and dot dash outline positions of Figure 1 representing respectively a brake release position and a brake setting position. It will be understood that as the brake lever 14 is pivoted as indicated, the brake cable 21 is retracted to apply a brake setting tension to the brakes of the vehicle.

Means are provided for retaining the foot brake lever 14 in brake setting position, and for releasing the brake lever from the brake setting position as desired. To this end, the upper portion of the lever is connected to a sector plate 23 provided with an arcuate series of ratchet teeth 24 on its rear edge cooperative with a detent tooth 25 carried by a rear end portion 11a of the bracket body 11.

The ratchet sector 23 is pivotally secured to the bracket body by means of a pin or rivet 26 at the center of curvature of the ratchet teeth 24. For moving the ratchet sector 23 about its pivot 26 as the brake lever 14 is moved to brake setting position, a pin or rivet 27 extends through the lever side walls 17 and 18 and through an arcuate slot 29 in the bracket body 11 and a radial slot 30 in the sector plate 23. The pin 27 and slot 30 constrain the sector plate 23 for pivotal movement with the brake lever 14 while accommodating a relative radial movement of the pin 27 toward the sector pivot 26. The arcuate slot 29 accommodates the arcuate movement of the pin 27 about the lever pivot 22. By preference, the ratchet sector 23 is mounted slidably alongside the bracket body 11 between the bracket body and the side wall flange 18 of the brake lever. The upper end portion of the right side wall flange 18 is inset as indicated at 18a to compensate for the thickness of the ratchet sector 23.

The pawl 25 is preferably formed of a heavy gauge sheet metal stamping and is of vertically elongated form and flat to lie slidably against the same face of the bracket body 11 that is slidably engaged by the sector 23 so that the pawl will lie in the same plane as the sector. By preference both the pawl and the sector are formed from material of the same thickness. A pivotal connection of the pawl 25 with the bracket body plate rear portion 11a is afforded by a pivot pin or rivet 31 (Figures 1 and 3) traversing the upper end portion of the pawl and the upper rear portion 11a of the bracket body.

For releasing the pawl 25 from the ratchet sector 23 in the release of the brakes, a hand release rod 35 is horizontally reciprocally mounted by means of a rearwardly extending bracket portion 36 secured to a lower rear portion 11b of the bracket body 11. The bracket 36 comprises a top or web portion 36a (Figure 3), having left and right side flanges 36b and 36c and has front and rear downturned flanges 36d and 36e providing bearing apertures for the rod 35. A front corner portion 36f of the side flange 36b overlies the bracket portion 11b and is secured thereto by any suitable means. An operating knob 38 is secured to the rear end of the rod 35 and is biased into its normal position, shown in solid outline in Figure 1, by means of a spring 39 bearing at its rear end against the rear flange 36e and at its forward end acting on the rod 35 through a collar 41.

For preventing inadvertent release of the brakes by accidental retraction of the knob 38, and to prevent children from releasing the brakes, the release rod 35 is coupled to the pawl 25 by a tension spring 43 whose tension in actuated position of rod 35 is inadequate to release the pawl 25 from the ratchet 23 against the normal pressure exerted by the brake cable 21 on the ratchet 23 (through the medium of the upper portion of lever 14 and pivot 27). In other words, when the knob 38 is retracted to its actuated position shown in dot-dash outline in Figure 1, the spring 43 is under tension in such an orientation as to urge the pawl 25 out of engagement with the ratchet teeth 24. However, the normal brake tension urges the ratchet teeth 24 into engagement with the pawl 25 in such a manner as to resist rotation of the pawl 25 out of engagement with the ratchet teeth 24 and this pressure is greater than the force exerted by the spring 43 on the pawl 25 in the disengaging direction. Thus, in order to release the brakes, a slight pressure must be exerted by the foot of the operator on the foot pedal 15 so as to release the normal braking pressure on the pawl 25 and allow the spring 43 to move the pawl to its dot-dash outline position shown in Figure 1.

As seen in Figures 3 and 4 the spring 43 may have its upper end hooked through an aperture 45 in the pawl 25 and may have its lower end hooked through a corresponding aperture 47 in the actuating rod 35. It will be observed from Figure 4 that the lower end portion 48 of spring 43 will engage downturned flange 36d of bracket 36 (Figure 1) to limit retraction of the rod 35, thus limiting the maximum tension which the spring 43 may apply to the pawl 25 to a force less than the normal brake force exerted by the cable 21 on ratchet plate 23 when the brakes are properly applied.

It will be apparent from Figure 1 that in normal position of the release rod 35 to which the rod is moved by means of the spring 39, the spring 43 is designed to still be under tensions but to be so disposed as to urge the pawl into engagement with the ratchet teeth 24, to maintain the brake lever 14 in incremental brake setting positions to which the brake lever may be moved by the operator. The spring 43 thus has a dual function, firstly of biasing the pawl into ratcheting position in normal condition of the manual release rod 35 and secondly of rendering the release rod 35 normally inoperative to release the pawl 25 to prevent inadvertent release of the brakes. It will be appreciated that the spring 39 would normally be designed to be under compression in normal position of the rod so as to positively maintain the rod 35 in its extreme forward position shown in Figure 1 with the knob 38 abutting against the rear flange 36e of the release rod mounting bracket 36. In other words, the compression spring 39 is responsible for maintaining the release rod in a normal position such that the tension spring 43 is effective to bias the pawl against the ratchet sector.

It will be apparent that the bracket 10 is to be mounted at a level in a vehicle with which associated so that the knob 38 is at a level convenient to the hand of the operator of the vehicle, which may be termed the hand level of the vehicle, while the brake lever 14 is of length to extend from such hand level to a level where the foot pedal 15 may be conveniently operated by the foot of the operator of the vehicle, herein termed the foot level of the vehicle.

After the brake lever assembly has been installed in a vehicle, and the emergency or parking brake cable indicated at 21 in Figure 1 has been attached to the upper end portion of the foot lever 14, the brake is easily set by pushing against the treadle or foot pedal portion 15 to swing the lower portion of the lever forwardly and the upper portion of the lever rearwardly, the sector 22 and pawl 25 functioning to retain the lever in the brake setting position. When it is desired to release the brake, the pull rod 35 is pulled rearwardly to the dot-dash position shown in Figure 1 to exert a disengaging force on the pawl 25 by means of the spring 43, and a slight pressure is applied to the foot pedal 15 in the brake setting direction to release the tension between the ratchet teeth 24 and pawl 25 whereupon the spring 43 moves the pawl 25 out of engagement with ratchet 23, the normal tension of the brake cable then being effective to pull the upper end portion of the lever 14 forwardly causing the foot pedal 15 to swing rearwardly under the control of the foot of the operator.

It will be understood that modifications and variations may be effected without departing from the scope of the novel concepts of the present invention.

I claim as my invention:

1. In a foot operated brake mechanism including a foot operated lever, a retaining mechanism operatively connected to said foot lever and operative in a brake setting position to retain the lever in incremental brake setting positions, and a hand operated release mechanism movable from a normal position to an actuated position in releasing said retaining mechanism, the improvement characterized by a spring operatively connected between said hand release mechanism and said retaining mechanism to urge said mechanism into brake setting position in normal position of said hand release mechanism and to urge said retaining mechanism out of brake setting position in actuated position of said hand release mechanism.

2. In a foot operated brake mechanism including a foot operated lever, a retaining mechanism operatively connected to said foot lever and operative in a brake settling position to retain the lever in incremental brake setting positions, and a hand operated release mechanism movable from a normal position to an actuated position in releasing said retaining mechanism, the improvement characterized by a spring operatively connected between said hand release mechanism and said retaining mechanism to urge said mechanism into brake setting position in normal position of said hand release mechanism and to urge said retaining mechanism out of brake setting position in actuated position of said hand release mechanism, the normal force of the brakes on said retaining mechanism being operative to maintain said retaining mechanism in brake setting position even with said hand release mechanism in actuated position until a slight pressure is applied to said foot lever.

3. In combination in a foot operated brake lever assembly, a bracket, a foot pedal lever pivoted to said bracket and depending therefrom, a ratchet member pivoted to said bracket and connected to said foot pedal lever for pivotal movement relative to the bracket upon pivotal movement of the lever, a pawl pivoted to said bracket and cooperating with said ratchet member for retaining said foot pedal lever in incremental brake setting positions, a manual release rod axially reciprocally mounted on said bracket for movement from a normal to an actuated position, and a coil tension spring connected between said rod and said pawl and operative in normal position of said rod to urge said pawl into engagement with said ratchet member.

4. In combination in a foot operated brake lever assembly, a bracket, a foot pedal lever pivoted to said bracket and depending therefrom, a ratchet member pivoted to said bracket and connected to said foot pedal lever for pivotal movement relative to the bracket upon pivotal movement of the lever, a pawl pivoted to said bracket and cooperating with said ratchet member for retaining said foot pedal lever in incremental brake setting positions, a manual release rod axially reciprocally mounted on said bracket for movement from a normal to an actuated position, and a spring connected between said rod and said pawl and operative in normal position of said rod to urge said pawl into engagement with said ratchet member and operative in actuated position of the rod to urge the pawl out of engagement with said ratchet member, the normal brake tension on said foot pedal lever being sufficient to retain said ratchet in engagement with said pawl against the action of said spring, whereby a slight pressure in brake release direction on said foot pedal lever in conjunction with retraction of said release rod is required to release said pawl.

5. In combination in a foot operated brake lever assembly, a bracket, a foot pedal lever pivoted to said bracket and depending therefrom, a ratchet member pivoted to said bracket and connected to said foot pedal lever for pivotal movement relative to the bracket upon pivotal movement of the lever, a pawl pivoted to said bracket and cooperating with said ratchet member for retaining said foot pedal lever in incremental brake setting positions, a manual release rod axially reciprocally mounted on said bracket for movement from a normal to an actuated position, and a spring connected between said rod and said pawl and operative in normal position of said rod to urge said pawl into engagement with said ratchet member and operative in actuated position of the rod to urge the pawl out of engagement with said ratchet member, the normal brake tension on said foot pedal lever being sufficient to retain said ratchet in engagement with said pawl against the action of said spring, whereby a slight pressure in brake release direction on said foot pedal lever in conjunction with retraction of said release rod is required to release said pawl, bracket means guiding said rod for reciprocal axial movement from normal to actuated position, and the connection of the spring with the rod being operative to engage said bracket means to limit retraction of said rod and to define actuated position thereof.

6. In combination in a brake lever structure, a bracket for attachment to a vehicle, a foot operated brake lever member having a pivot connection to said bracket, a ratchet member having a pivot connection to said bracket spaced from the lever pivot connection, and a pin and slot connection between said brake lever member and said ratchet member for moving said ratchet member about its pivot as said brake lever member is moved about its pivot.

7. In combination in a brake lever structure, a bracket for attachment to a vehicle, a foot operated brake lever member having a pivot connection to said bracket, a ratchet member having a pivot connection to said bracket spaced from the lever pivot connection, and a pin and slot connection between said brake lever member and said ratchet member for moving said ratchet member about its pivot as said brake lever member is moved about its pivot; the pin and slot connection comprising a pin secured to one of said members and a slot extending radially of the pivot connection of the other of said members.

8. In combination in a brake lever structure, a bracket for attachment to a vehicle, a foot operated brake lever member having a pivot connection to said bracket, a ratchet member having a pivot connection to said bracket spaced from the lever pivot connection, and a pin and slot connection between said brake lever member and said ratchet member for moving said ratchet member about its pivot as said brake lever member is moved about its pivot, the pin and slot connection comprising a pin secured to one of said members and a slot extending radially of the pivot connection of the other of said members, and said bracket having an arcuate slot on the radius about the pivot connection of said one member for receiving said pin.

9. In combination in a brake lever structure, a supporting bracket having a flat body generally in a vertical plane, a brake lever having a bifurcated upper end having upper flat end portions extending on either side of said flat body and having a pivot connection to said flat body, the upper end of said lever having a brake cable receiving aperture above said flat body, said flat body having an arcuate slot in the upper portion thereof about said brake lever pivot connection, a ratchet sector plate having a pivotal connection to said flat body disposed between said brake lever pivot connection and said arcuate slot and having a slot extending radially of its pivot connection and intersecting said arcuate slot, and a pin extending through the intersecting slots and secured to the upper end portions of said brake lever for pivoting said ratchet plate with said brake lever.

10. In combination in a brake lever structure, a supporting bracket having a flat body generally in a vertical plane, a brake lever having a bifurcated upper end having upper flat end portions extending on either side of said flat body and having a pivot connection to said flat body, the upper end of said lever having a brake cable receiving aperture above said flat body, said flat body having an arcuate slot in the upper portion thereof about said brake lever pivot connection, a ratchet sector plate having a pivotal connection to said flat body disposed between said brake lever pivot connection and said arcuate slot and having a slot extending radially of its pivot connection and intersecting said arcuate slot, and a pin extending through the intersecting slots and secured to the upper end portions of said brake lever for pivoting said ratchet plate with said brake lever, a pawl pivotally carried on said flat body on the same side as said ratchet plate for cooperation with said ratchet plate, and manually operable pawl release means carried by said bracket.

11. In combination in a brake lever structure, a supporting bracket having a flat body generally in a vertical plane, a brake lever having a bifurcated upper end having upper flat end portions extending on either side of said flat body and having a pivot connection to said flat body, the upper end of said lever having a brake cable receiving aperture above said flat body, said flat body having an arcuate slot in the upper portion thereof about said brake lever pivot connection, a ratchet sector plate having a pivotal connection to said flat body disposed between said brake lever pivot connection and said arcuate slot and having a slot extending radially of its pivot connection and intersecting said arcuate slot, and a pin extending through the intersecting slots and secured to the upper end portions of said brake lever for pivoting said ratchet plate with said brake lever, a pawl pivotally secured to said bracket on the same side thereof as said ratchet plate and cooperating with said ratchet plate to define a plurality of brake setting positions of said brake lever, manually operable pawl release means carried by said bracket, spring means between said pawl and said manual release means operative in one position of said manual release means to urge said pawl into engagement with said sector plate and in the other position of said manual release means operative to urge said pawl out of engagement with said sector plate.

12. In combination in a foot operated brake lever assembly, a bracket, a foot pedal lever pivoted to said bracket and depending therefrom, a ratchet member pivoted to said bracket and connected to said foot pedal lever for pivotal movement relative to the bracket upon pivotal movement of the lever, a pawl pivoted to said bracket and cooperating with said ratchet member for retaining said foot pedal lever in incremental brake setting positions, a manual release rod axially reciprocally mounted on said bracket for movement from a normal to an actuated position, and a spring connected between said rod and said pawl and operative in normal position of said rod to urge said pawl into engagement with said ratchet member, bracket means having a pair of spaced downturned flanges guiding said release rod for axial reciprocation, a knob on one end of said release rod beyond said downturned flanges and for abutment against one of said downturned flanges in normal position of said rod, spring means urging said rod to normal position, and means on said rod for engagement with the other of said downturned flanges for limiting movement of said rod toward actuated position to limit the tension on said spring in actuated position of said rod, said spring in actuated position being operative to urge said pawl out of engagement with said ratchet member.

13. In combination in a foot operated brake lever assembly, a supporting bracket having a flat body generally in a vertical plane, a brake lever having a bifurcated upper-end having upper flat end portions extending on either side of said flat body and having a pivot connection to said flat body, the upper end of said lever having a brake cable receiving means above said flat body, a flat ratchet member pivoted to said bracket in face-to-face sliding relation to one side thereof and connected to said lever for pivotal movement relative to the bracket upon pivotal movement of the lever, a flat pawl pivoted to said bracket in face-to-face sliding relation on the same side of said bracket body and cooperating with said ratchet member to retain said foot pedal lever in incremental brake setting positions, an auxiliary bracket means secured to the rear end of said bracket body and extending rearwardly and generally horizontally therefrom and providing a pair of generally horizontally spaced axially aligned bearings, a manual release rod journalled in said bearings for axial reciprocation and having a forward end projecting beyond said auxiliary bracket to a position adjacent said pawl, a tension spring connected between said pawl and the forward end of said release rod, means defining two limit positions of said release rod, the release rod in its extreme forward position inclining said tension spring to urge said pawl into engagement with said ratchet member and in its extreme rearward position oppositely inclining said tension spring to urge said pawl out of engagement with said ratchet member, the tension of the brakes on said ratchet member being sufficient to retain said pawl in engagement with said ratchet member against the action of said tension spring to require a brake setting pressure on the foot lever to render said tension spring operative to release the brakes.

14. In combination in a foot operated brake lever assembly, a bracket, a foot pedal level pivoted to said bracket and depending therefrom, a ratchet member pivoted to said bracket and connected to said foot pedal lever for pivotal movement relative to the bracket upon pivotal movement of the lever, a pawl pivoted to said bracket and having a free end portion depending therefrom with a tooth on said free end portion cooperating with said ratchet member for retaining said foot pedal lever in incremental brake setting positions, a manual release rod horizontally reciprocally mounted on said bracket with an end portion below said pawl free end portion for movement between a normal and an actuated position, and a tension spring connected between said rod end portion and said pawl free end portion, said spring inclining toward and away from said ratchet member in the normal and actuated positions of the rod respectively to selectively urge said pawl tooth into and out of engagement with said ratchet member.

15. In combination in a foot operated parking brake assembly, bracket means, foot operated lever means mounted by said bracket means for movement in a brake setting direction and having means for engagement by the foot of an operator, ratchet means coupled to said foot operated lever means for arcuate movement relative to the foot operated lever means, pawl means movably mounted by said bracket means and disposed in one position thereof to engage said ratchet means and retain the foot operated lever means in successive brake setting positions, control means movable to an actuating position to control movement of said pawl means into a position in engageable relation to said ratchet means, first spring means interposed between said bracket means and said control means for urging said control means toward its actuating position, and second spring means interposed between said control means and said pawl means for urging said pawl means toward said position in engageable relation to said ratchet means when said control means is in its actuating position.

References Cited in the file of this patent
UNITED STATES PATENTS

| | | |
|---|---|---|
| 1,654,321 | Collins | Dec. 27, 1927 |
| 1,823,695 | Moorhouse | Sept. 15, 1931 |
| 2,120,362 | Jandus | June 14, 1938 |
| 2,467,557 | Jandus | Apr. 19, 1949 |
| 2,682,178 | Powell | June 29, 1954 |
| 2,694,945 | Jandus | Nov. 23, 1954 |